United States Patent

[11] 3,599,665

[72] Inventor Howard I. Dwyer, Jr.
 Glen Ellyn, Ill.
[21] Appl. No. 860,658
[22] Filed Sept. 24, 1969
[45] Patented Aug. 17, 1971
[73] Assignee Armsted Industries Incorporated
 Chicago, Ill.

[54] AUTOMATIC AIR LINE CONNECTION SYSTEM
 8 Claims, 6 Drawing Figs.
[52] U.S. Cl. .................................................. 137/349,
 137/599, 213/76, 251/149.6, 303/79
[51] Int. Cl. .................................................. B61g 5/06,
 B60t 7/20
[50] Field of Search........................................... 137/347,
 345, 599, 349; 213/76; 303/7, 8, 68, 75, 76, 79

[56] References Cited
 UNITED STATES PATENTS
 2,173,954 9/1939 Stevens ..................... 213/76
 3,179,473 4/1965 McMillan .................... 137/345 X

*Primary Examiner*—Robert G. Nilson
*Attorneys*—Walter L. Schlegel, Jr. and Norvell VonBehren ABSTRACT: An automatic system for connecting and disconnecting the brake pipe air lines between two adjacent cars is disclosed. The system requires no manual operation other than that required for operating the automatic car coupler and comprises a plurality of probe members and probe receiving members being mounted at the coupler of each car to provide parallel flow paths for the brake pipe air between each car. Included in the system is control circuitry contained on each car for utilizing the parallel flow paths for feedback from one circuit to another to permit conventional operation of the air brake equipment while providing additional features such as automatic serial charging of the car brakes upon coupling, manual retention of air in brake pipe in either car at uncoupling and automatic reset of the control circuitry after an uncoupling operation to permit conventional use of air brake equipment.

PATENTED AUG 17 1971
3,599,665
SHEET 1 OF 2
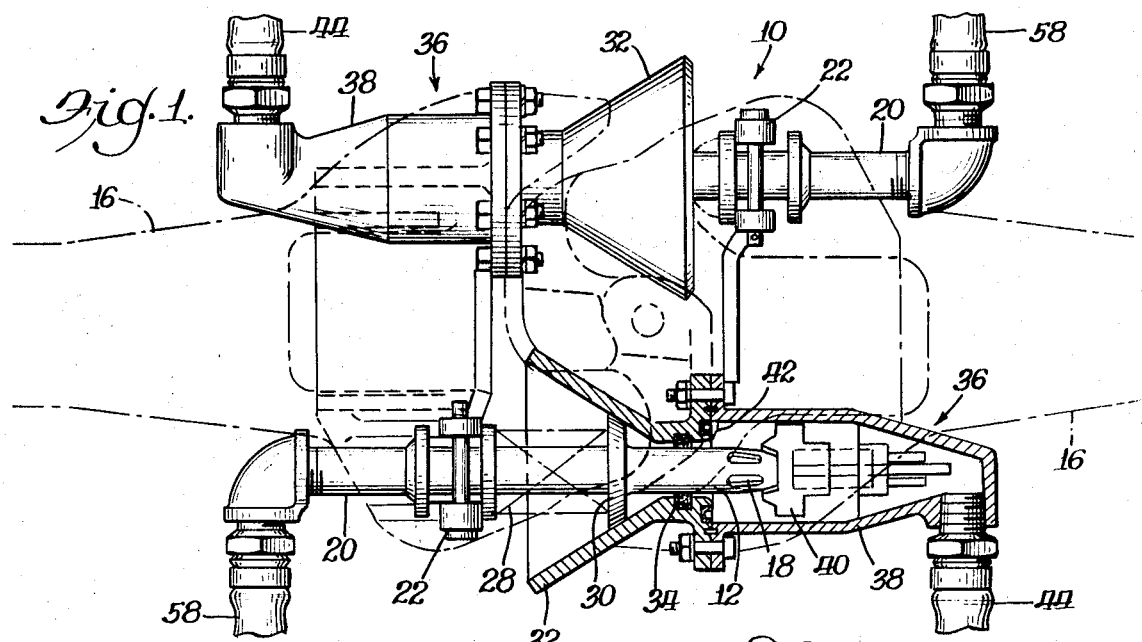
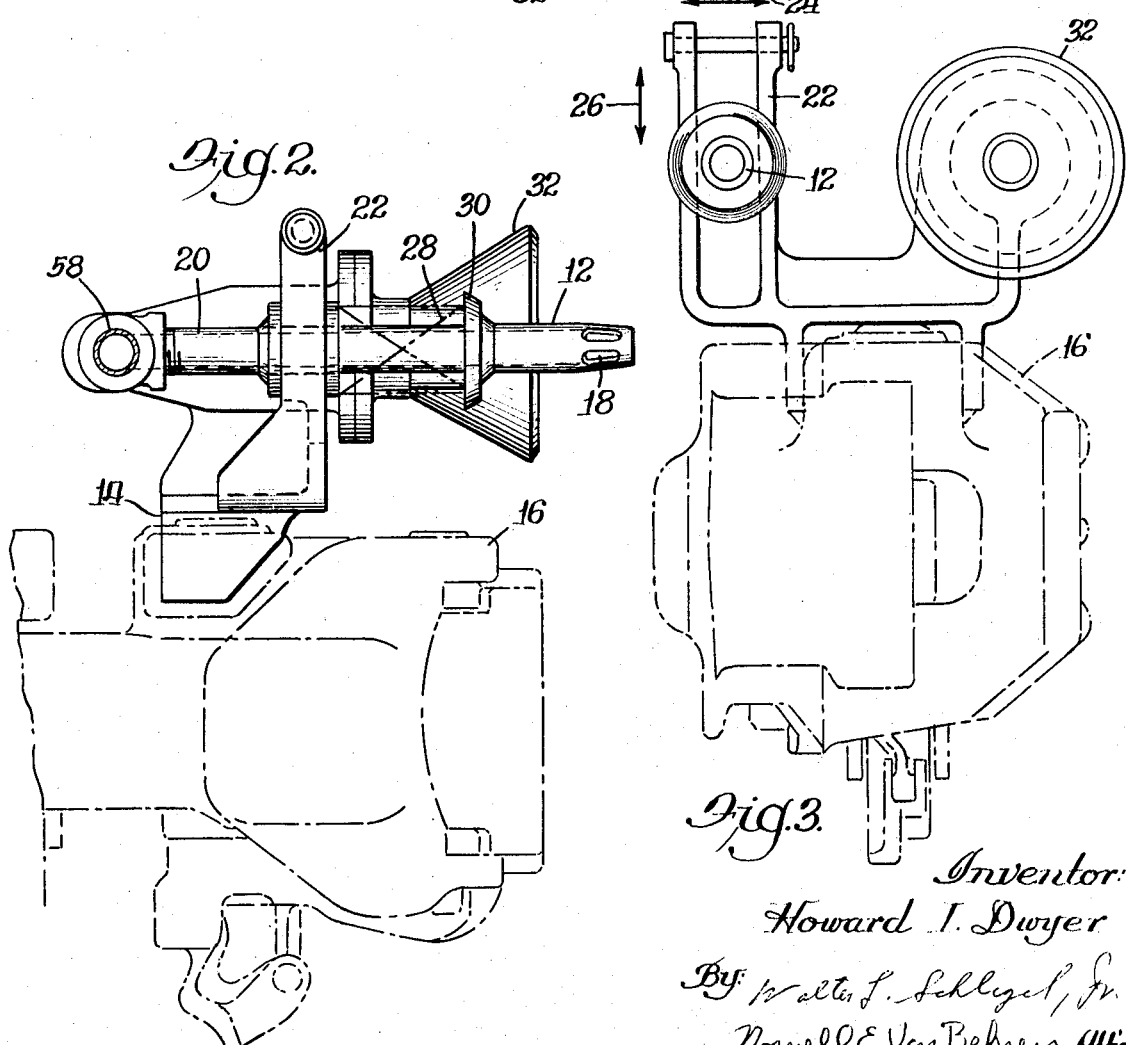
Inventor:
Howard I. Dwyer

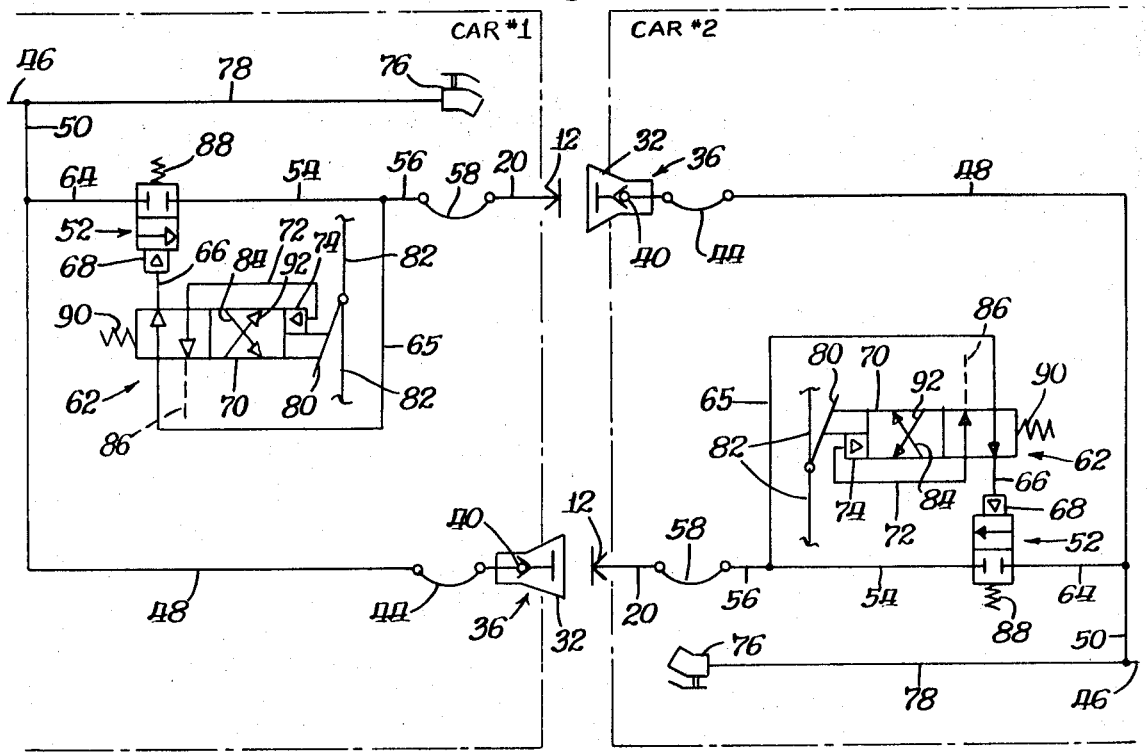
Fig. 4.
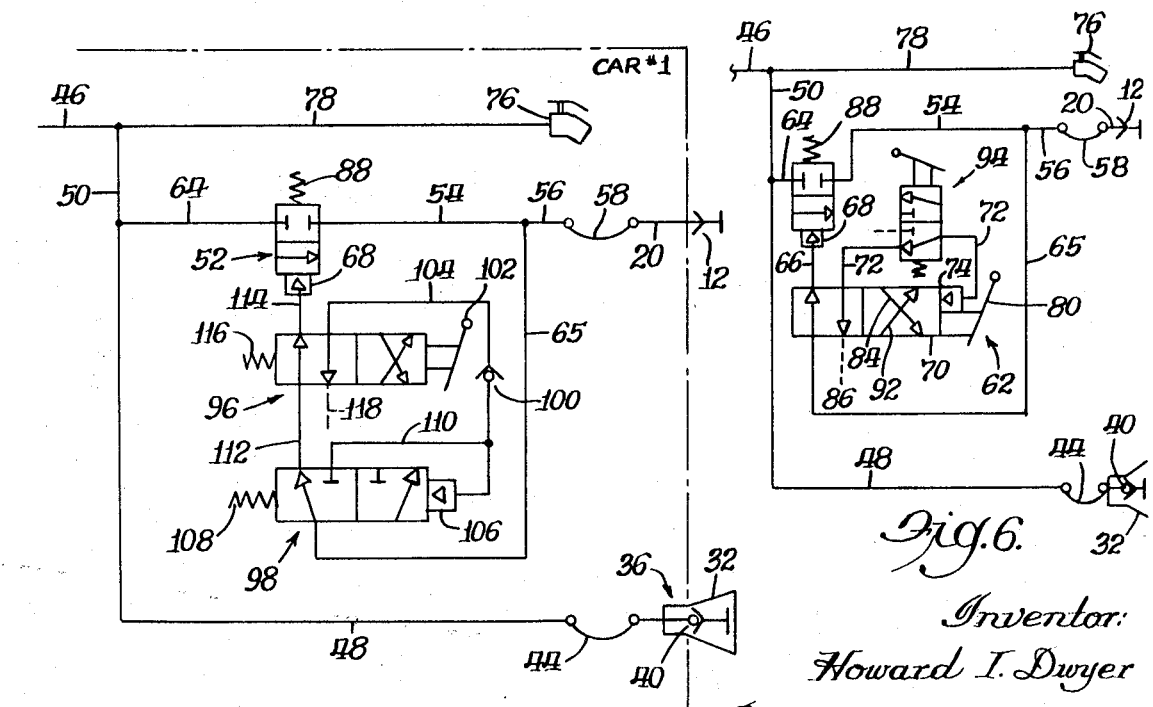
Fig. 5.
Fig. 6.
Inventor:
Howard I. Dwyer

AUTOMATIC AIR LINE CONNECTION SYSTEM

BACKGROUND OF THE INVENTION

This invention relates to railroad air brake equipment in general and more particularly to a new and novel automatic air line connection system for a plurality of railroad cars which provides a means for connecting and disconnecting the brake pipe air line of the adjacent car without the need for any manual operation other than that required to operate the automatic car coupler.

The coupling of air lines between railroad cars consumes large amounts of time when done manually as is the present accepted practice. Manual coupling of the air lines also is extremely dangerous since the person doing the coupling must enter into the restricted space between the cars to complete the coupling operation.

The automatic coupling and uncoupling of the brake pipe air line between adjacent cars has been attempted many times in the past. Such prior art systems generally provided for automatic coupling of the brake pipeline along with other lines but required a manual operation for inspection of the brake pipe anglecock to assure that a free flow of brake pipe air was maintained between the cars after the automatic connection. In addition, prior art coupling systems did not provide means to retain the air on the respective cars after an uncoupling operation thereby requiring a longer charging time of the brake pipe system on the train, when a subsequent coupling was performed. A further drawback in prior art systems consisted of a failure to provide for compatible operation with existing cars which were not similarly equipped with an automatic connection system.

SUMMARY OF THE INVENTION

The present invention overcomes the difficulties and limitations found in the prior art pneumatic air line connection systems by providing for a new and novel system of interacting automatically controlled valves mounted on the respective ends of each equipped car and operating with a new and novel plurality of probe members and probe receiving members to control the flow of brake pipe air between the cars. The automatic system of the invention comprises a plurality of probe members mounted at one side of each coupler in the system and designed for interconnection with a plurality of probe receiving members mounted at the opposite side of each coupler of the cars in the system. Combined with these members are a plurality of control means mounted on each end of each car in the system to control the flow of brake pipe air between the respective cars and to provide the system for automatically connecting and disconnecting the air brake line between the cars while retaining the brake pipe air on the respective cars when desired upon an uncoupling of the cars by the brakeman.

The system of the invention provides for flexibility of operation in conjunction with cars that are not similarly equipped by making the automatic air line connection system independent of the existing manual anglecocks and air hoses with which all cars are normally equipped while still retaining these anglecocks and hoses. The use of the system of the invention does not in any way affect or alter the function or operation of the conventional air brake equipment mounted on the respective cars.

Accordingly, it is an object of the invention to provide a new and novel automatic air line connection system having features which allow for automatic connection and disconnection of the train line brake pipe system without requiring manual opening and closing of the brake pipe anglecocks.

Another object of the invention is to provide a new and novel automatic air line connection system that provides parallel flow paths for the brake pipe air one of which is used for feedback purposes in the control system to provide automatic shutoff of brake pipe air to atmosphere after an uncoupling operation and allow for automatic serial charging of the individual cars in the train upon their subsequent reconnection to the train.

Yet another object of the invention is to provide a new and novel system which will vent the train brake pipe to set the emergency brake upon an accidental train separation and thereafter automatically close the brake pipe after the train brakes are set.

Still another object of the invention is to provide a new and novel automatic air line connection system that has features which allow the brakeman to retain the brake pipe air on each car during a disconnect of that car from the train without requiring a closing of the individual anglecocks on the brake pipeline prior to disconnection.

Yet another object of the invention is to provide a new and novel fully automatic air line connection system which will eliminate existing dangers to the train crew occurring during connection of the present air lines.

A further object of the invention is to provide a new and novel quick disconnect coupling for use with the system of the invention which permits limited vertical and horizontal movement of the couplers without damaging the coupling or destroying the air sealing capabilities of the coupling.

Still another object of the invention is to provide a new and novel automatic air line system that may be compatibly used in a train having some cars that do not contain the system without affecting the operation of the standard air braking system.

These and other objects and advantages of the invention will become apparent from a study of the attached drawings and from a reading of the description of the preferred embodiment.

BRIEF DESCRIPTION OF THE DRAWINGS

FIG. 1 is a top plan view, partially in section, of a pair of probe members and probe receiving members of the invention shown mounted in the interconnection position at the couplers;

FIG. 2 is a side elevational view of the probe member and the probe receiving member shown mounted at a coupler;

FIG. 3 is a front elevational view showing the probe member and the probe receiving member mounted at the coupler;

FIG. 4 is a schematic diagram of the automatic air line connection system of the invention as applied to the ends of two cars in a train;

FIG. 5 is a schematic diagram of a modification of the automatic air line connection system shown in FIG. 4; and FIG. 6 is a schematic diagram of a modification of the circuitry which may be added to the automatic air line connection system shown in FIG. 4 to provide a manual override feature.

DESCRIPTION OF THE PREFERRED EMBODIMENT

Referring now to the drawings in general and to FIGS. 1, 2 and 3 in particular, there is shown generally at 10 a quick disconnect coupling for the automatic air line connection system which comprises a probe member 12 mounted by means of a resilient mounting 14 at one side of each coupler 16 of the train. The probe members 12 are formed of a hollow tube and contain a plurality of apertures 18 in communication with the interior of the hollow tube and with the air line 20.

The probe members 12 are mounted within a U-shaped section 22 in such a manner as to permit them to angle in any direction in the U-shaped section 22 and to move horizontally along their own axis as well as in the directions shown by the arrows 24 and 26. All of these degrees of freedom of the probe member 12 are necessary to allow for the play or slack between two mating couplers. A spring means shown diagrammatically as 28 is positioned between the U-shaped section 22 and a sealing means 30 to resiliently urge the probe member 12 to return to a horizontal position as shown in FIG. 1 after it has been displaced as hereinafter described. Spring means 28 also serves to keep the probe member 12 tightly and completely inserted in the probe receiving member 32 to assure positive sealing and to allow the probe member 12 to align itself with the probe receiving member 32.

The sealing means 30 surrounds the probe member 12 and serves as a secondary seal to seal the flow of air between the cars from atmosphere whenever interconnection is made between the probe member 12 and its probe receiving member 32.

Rigidly mounted on the other side of the probe member 12 at each coupler is a probe receiving member 32 which is funnel shaped in the configuration shown and has contained therein a sealing means 34 in the form of an O-ring seal of a size sufficient to seal a flow of air to atmosphere whenever the probe member 12 is interconnected with the probe receiving member 32 as shown in FIG. 1.

Associated with the funnel shape probe receiving member 32 is normally closed quick disconnect valve assembly shown generally at 36 and comprises an outer member 38 and an inner spring loaded, normally closed, quick disconnect valve 40. The valve 40 is shown in the open position in FIG. 1 and is designed to close by engagement with a valve seat 42 contained within the outer member 38 whenever the probe member 12 is disconnected from the funnel-shaped probe receiving member 32.

The valve assembly 36 is in communication with the train brake pipe through a flexible hose 44 as will be better shown in FIG. 4 hereinafter described.

By mounting a probe member 12 and a probe receiving member 32 at each coupler of each car in the train, there is provided the necessary symmetry to the system which allows the respective cars to be coupled up regardless of the position of the car in the train or the rotational position of the car. In addition, the resilient mounting of the probe member 12 allows it to be interconnected with the probe receiving member 32 during a misalignment of the coupler without damaging the members or the sealing means contained within the members. While in the embodiment shown in FIGS. 1, 2, and 3 the probe member 12 is resiliently mounted, it is obvious that the probe receiving member 32 may also be resiliently mounted without departing from the spirit or scope of the invention.

Referring now more particularly to FIG. 4 there is shown a schematic diagram of the automatic air line connection system showing the respective components mounted on the end of a pair of coupled cars. As before mentioned car number 1 contains a probe member 12 which is connected to the air line 20 and is mounted at the coupler 16 at a predetermined distance and height from the coupler center line. Mounted on the other side of the coupler 16 at the same predetermined distance and height is the probe receiving member 32 which is connected to the flexible hoses 44 which are in communication with the brake pipe 46 by means of the air line 48 and the air line 50.

Since the probe member 12 and the probe receiving member 32 are mounted in the before mentioned manner it is clear that they are thereby symmetrically opposite to each other and as a result similar members mounted on the next succeeding cars would then come in a direct contact with these members and would interconnect during the coupling of the cars. Also being thusly mounted it is immaterial which end of the car is positioned with the next succeeding car since the members are designed to interconnect in any position.

The probe member 12 is connected to a first valve 52 by means of the air line 54, the air line 56 and the flexible hose 58. The first valve 52 is a normally closed, pilot operated valve which is mounted on each end of each car in the system and serves as a means to shut off the flow of brake pipe air from the brake pipe 46 to the probe member 12.

The first valve 52 is shown in the normally closed position in the schematic diagram of FIG. 4 and contains a plurality of internal parts which are positioned to open or close the flow of air between the air line 54 and air line 64 in communication with the brake pipe 46 by means of air line 50.

Contained within the circuitry for the system and mounted on each end of each car is a control means shown generally as the numeral 62 for controlling the flow of pilot air from the probe member 12 through the air line 65 to the air line 66, and to the pilot operator 68 of the first valve 52 to open the first valve 52 during interconnection of the respective probe members 12 and probe receiving members 32 mounted on the couplers 16 of the cars of the train.

The control means 62 comprises a manually operated, spring biased, second valve 70, which has associated therewith switching means to switch the pilot air from the air line 65 to the second valve 70 to retain the second valve 70 in a venting position against its spring bias whenever the second valve 70 is manually operated. The switching means may be contained within the second valve 70 or may be exterior to the valve as will be more fully described hereinafter in FIG. 5. When the switching means is contained within the valve 70 as shown in FIG. 4 it would comprise a series of internal ports in the valve which allow the valve 70, upon a manual operation, to connect air line 65 with air line 72 to switch the pilot air supply contained in air line 65 to the pilot operator 74 contained on the second valve 70. Simultaneously, the manual operation of the second valve 70 would vent the pilot air contained at the air line 66 to atmosphere thereby allowing the first valve 52 to return to its normally closed position as shown in FIG. 4 to close off the flow of brake pipe air contained in the brake pipeline 46 to the probe member 12 and to atmosphere upon a disconnection of the probe member 12 from the probe receiving member 30.

OPERATION

In the operation of the system, the anglecocks 76 contained on the air line 78 of the standard railroad cars are manually closed upon installation of the system components on the railroad car. In addition to being closed, it is preferred for safety reasons, that the anglecocks 76 be safety wired shut when the railroad cars are to be equipped with the system of the invention and are to be used in automatic operation.

In describing the operation of the system of the invention in coupling a precharged train to a single uncharged car, reference should be made to FIG. 4 of the drawings wherein car number 1 is assumed to be the uncharged car and car number 2 is assumed the charged end car of the charged train. The schematic diagram of FIG. 4 shows both cars in the normal condition prior to coupling.

When an interconnection of car number 1 and car number 2 is made, the probe members 12 mate with the probe receiving members 32 and open the quick disconnect valves 40 contained within the valve assembly 36 to permit brake pipe air contained within the brake pipe 46 on a car number 2 to flow through line 48 of car number 2 through the probe receiving member 32 into the probe member 12 contained on the car number 1. As beforementioned the first valve 52 on car 1 is pilot air operated by air pressure through air line 65 and through the control means 62. Accordingly, upon interconnection, brake pipe air will flow through air line 65 to air line 66 to air pilot the first valve 52 on car number 1 against the spring bias of the valve to position the first valve 52 in the open position to allow a free passage of brake pipe air from car number 2 to pass through air line 54 of car number 1 and then through air line 64 and air line 50 of the same car to charge the brake pipeline 46 of car number 1.

At the same time due to the parallel path provided by the other probe members 12 and probe receiving members 32 between the cars, air is also fed back through line 48 on car number 1 to the funnel-shaped probe receiving member 32 on car number 1 and through the quick disconnect valve 40 to the probe member 12 contained on the car number 2. This feedback air, in the same manner as before described, then operates to pilot, through air line 65 on car number 2 the pilot operator 68 of the first valve 52 of car number 2 to position the first valve 52 in the open position against the spring bias of the valve and to retain the valve in the open position.

Thereafter the brake pipelines 46 on car number 2 and car number 1 are connected through the first valve 52 on both cars by parallel paths to provide free air passage between the cars and to allow the conventional air brake equipment on the cars to function in its normal manner.

Upon an intentional uncoupling of the cars or an accidental separation of the cars whereby it is intended that a venting of the brake pipes occur in order to set the automatic emergency air brakes on each car, the separation between the two cars causes the respective probe members 12 to separate from the probe receiving members 32. The quick disconnect valves 40 are then closed by their spring bias to shut off the flow of brake pipe air from the air lines 48 to the atmosphere at the quick disconnect shut off valves 40. Since the brake pipe air cannot vent to atmosphere through the probe receiving members 32 it must vent through the first valves 52 and the probe members 12 at a predetermined controlled rate. The first valves 52 are thereafter held open by their pilot air until pressure in the line 56 has dropped below the pilot pressure required to overcome the spring bias of the first valves 52. This pressure drop then is sufficient to set the emergency brakes on the respective cars.

After the pressure in the line 56 of the cars drops below the spring bias of the valves 52, the first valves 52 will be closed by the spring bias to seal off the parallel path of brake pipe to the atmosphere through air line 64 and 54. In this manner the valve 52 is returned to its normally closed position and is ready for a subsequent interconnection of the cars to sequentially charge the cars as they are coupled together.

When it is intended to uncouple a car or group of fully charged cars without venting the brake pipe on the cars, the manual operating lever 80 of the second valve 70 on the car or cars in which pressure is to be retained is operated by the trainman who is operating the car uncoupling mechanism. The operating lever 80 may be actuated by a push rod 82 from either side of the car to permit the trainman to retain pressure on either or both cars to be uncoupled by an operation at a single location beside the track. This improved safety feature eliminates the necessity of the trainman stepping in between the cars to operate and close the anglecocks 76 upon an uncoupling as is now the present practice.

The operation of the lever 80 of the second valve 70 causes the second valve 70 on that car to be moved against its spring bias to the venting position to vent the pilot air in line 66 through the passage 84, in the second valve 70, to the atmosphere, shown as a dashed line 86 in FIG. 4. The spring bias 88 of the first valve 52 thereafter causes the first valve 52 to return to its normally closed position to shut off the flow of brake pipe air to the probe member 12 and atmosphere.

Simultaneously, line pressure is applied through passageway 92 of the second valve 70 to switch the line pressure to the air line 72 to the pilot operator 74 to cause the second valve 70 to remain in the same position as the actuation of the operating lever 80 had positioned it. Thereafter, a release of the operating lever 80 will not affect the position of the second valve 70 and it will remain in its venting position until a subsequent venting of the air line 65 as before described. The pilot 68 of the first valve 52 thusly remains at atmospheric pressure and the first valve 52 remains in its normally closed position due to the spring bias 88.

Upon a subsequent uncoupling of the cars at this point, the pilot air in air line 65, 72 and the pilot operator 74 is exhausted to atmospheric though the probe member 12 to permit the spring bias 90 to return the second valve 70 to its nonventing position. As a result, the pilot operator 68 of the first valve 52 is again connected to the air line 65, which is at atmospheric pressure, and the spring bias 88 holds the first valve 52 in its normally closed position. The operation thusly described permits the first valve 52 to be closed for whatever period of time is desired between initiating the uncoupling action and the actual separation of the cars while still allowing the next coupling action to open the first valve 52.

Referring now to FIG. 6 there is shown a modification to the circuit just described wherein a manually operated spring biased third valve 94 is associated with the switching means of the second valve 70 and is interposed between the passageway 92 and the pilot operator 74 in the air line 72. The third valve 94 functions to allow the second valve 70 to return to the nonventing position without requiring a disconnection of the probe members 12 and the probe receiving members 32 so that a manual reopening of the first valve 52 may be obtained. As a result, the trainman is permitted to change his mind after manually operating the lever 80 to shut off the airflow in the brake pipes before uncoupling the car. Without the third valve 94 in the circuit, it would be necessary to disconnect the probe members 12 from the probe receiving members 32 to bleed down the pilot air lines before the second valve 70 would shift position to reconnect the pilot of the first valve 52 to brake pipeline pressure.

Referring now to FIG. 5 there is shown a schematic diagram of a modification of the basic invention as shown in FIG. 4, wherein the control means 62 is replaced with a spring biased fourth valve 96, a spring biased fifth valve 98 and a check valve 100 in the positions shown in the circuit. Actuation of the hand lever 102 causes the pilot of the first valve 52 to exhaust to atmosphere to close the first valve 52. Brake pipeline pressure is applied through the air line 104 and through the check valve 100 to the pilot operator 106 of the fifth valve 98.

Thereafter the fifth valve 98 will shift against its spring bias 108, causing line pressure to be applied to the pilot operator 106 of the fifth valve 98 through the fifth valve 98 and the air line 110.

A subsequent release of the operating lever 102 of the fourth valve 96 will cause the spring bias 116 of the fourth valve 96 to return the valve to its initial position. Since the flow of air to air line 112 is blocked by the position of the fifth valve 98, the first valve 52 will not shift against its spring bias 88 and the air lines 46 and 54 remain disconnected.

The check valve 100 prevents flow of air from line 65 through the fifth valve 98 to the exhaust 118 of the fourth valve 96. Without the check valve 100, the air line 65, and hence the brake pipeline 54, would be vented through exhaust 118, causing the brake pipe to bleed down as well as bleeding pilot air from the fifth valve 98 to exhaust 118. When the cars are subsequently uncoupled and pressure in the air line 54 reduces to atmospheric, air flows from the pilot operator 106 of the fifth valve 98 back through the air line 110, the fifth valve 98, the air line 65 and the probe member 12 causing the fifth valve 98 to be returned by its spring bias 108 to its initial position and readying the system for the next coupling action.

In the basic system and modifications hereinbefore described, selection of the air line lengths and sizes, valve sizes and other components size would be accomplished to provide flow rates and volumes which would permit full unrestricted flow from the train brake pipeline 46 in both directions through the first valve 52 and through the probe members 12, probe receiving members 32 and their related connections. In addition, flow rates and volumes would be provided to allow pressure retention by the pilot operator 68 of the first valve 52 until brake pipeline pressure between the first valve 52 and the probe members 12 has reduced to substantially atmospheric pressure. The flow rates and volumes of the system would also be provided to obtain an immediate reduction of the first valve 52 pilot pressure in air line 66 to atmosphere through the second valve 62 or the fourth valve 96, depending upon the modification used, when the operating levers 80 or 102 of these respective valves are actuated.

The addition of auxiliary components such as accumulators, flow control valves, and orifices may be added to the basic system to insure proper timing without departing from the spirit and scope of the invention. In addition, the application of filters, lubricators and similar conditioning means may be added to the basic system to assure proper function and life of the system components.

From the foregoing, it can be seen that a new and novel air line connection system has been provided for accomplishing all of the objects and advantages of the invention. Nevertheless, it is apparent that many changes in details of construction or arrangement of the parts of the invention may be made without departing from the spirit and scope of the invention as expressed in the accompanying claims and the invention is not to be limited to the exact matters shown and described since only the preferred embodiment has been given by way of illustration only.

Having described the invention, I claim:

1. An automatic air line connection system for a plurality of railroad cars that have mating couplers and related air brake equipment for controlling the discharge of air from the air brake pipe, comprising:
   a. a probe receiving member, associated with the brake pipe and mounted at the same side of each coupler at a predetermined distance from the coupler centerline and a predetermined height from the coupler centerline;
   b. a normally closed quick disconnect, valve associated with each probe receiving member and positioned between the brake pipe and said probe receiving member;
   c. a probe member associated with the brake pipe and mounted at the other side of each coupler opposite said probe receiving members and at substantially the same predetermined distance and height as said probe receiving members, said probe member and probe receiving member on each car being designed for interconnection during coupling of the cars with a mating probe receiving member and probe member contained on the other car, said interconnection causing said normally closed disconnect valves to open thereby providing parallel flow paths for brake pipe air between each pair of cars;
   d. a normally closed, pilot operated, first valve, mounted on each end of each car and interposed between the brake pipe and said probe member to shut off the flow of brake pipe air to said a probe member; and
   e. control means, associated with said first valve and said probe member for controlling a flow of pilot air from said probe member to open said first valve during interconnection of the respective probe and probe receiving members mounted at the couplers and to permit said first valve to return automatically to the normally closed position when the brake pipe air pressure has reduced to substantially atmospheric pressure after a disconnection of said probes from said probe receiving members.

2. The air line connection system as defined in claim 1 wherein said control means comprises a manually operated, spring biased, second valve for manually positioning said second valve in a venting position against the spring bias, said venting position serving to vent the pilot air from said first valve thereby causing said first valve to return to the normally closed position and allowing a disconnection of said probes from said probe receiving members while retaining the brake pipe air in the brake pipes on the respective cars, said control means further comprising switching means, associated with said second valve for switching the pilot air from said first valve to said second valve whenever said second valve is manually operated to retain said second valve in the venting position against its spring bias until the pilot air pressure from said probe member vents to atmosphere upon a disconnection of said probe receiving member and said probe member whereupon the bias of said second valve will return said second valve to the nonventing position.

3. The air line connection system as defined in claim 2 wherein said second valves are mounted on each end of the car and are operatable from either side of the car thereby eliminating the necessity of the trainman stepping in between the cars to operate the car anglecock prior to the disconnection.

4. The air line connection system as defined in claim 3 further comprising a manually operated, spring biased, third valve associated with said switching means for venting said switching means to allow said second valve to return to the nonventing position without requiring a disconnection of said probe and said probe receiving members.

5. The air line connection system as defined in claim 1 further comprising sealing means associated with said members for sealing said members during interconnection of said members to prevent leakage of brake pipe air to atmosphere through said members.

6. The air line connection system as defined in claim 5 wherein said sealing means comprises:
   a. a primary seal contained within said probe receiving member; and
   b. a secondary seal contained on said probe member.

7. The air line connection system as defined in claim 6 wherein said probe members are resiliently mounted at the couplers to allow said probe and probe receiving members to interconnect on cars having misaligned couplers and to have relative motion with respect to each other without damaging said members or destroying the air sealing capabilities of said members.

8. An automatic air line connection system for a plurality of railway cars that have mating couplers and related air brake equipment for controlling the discharge of air from the car brake pipe, comprising:
   a. a probe receiving member, associated with the brake pipe and mounted on the same side of each coupler at a predetermined distance from the coupler centerline and a predetermined height from the coupler centerline;
   b. a normally closed, quick disconnect, valve associated with each probe receiving member and positioned between the brake pipe and said probe receiving member;
   c. a probe member associated with the brake pipe and resiliently mounted on the other side of each coupler opposite said probe receiving members and at substantially the same predetermined distance and height as said probe receiving members, said probe member and probe receiving member on each car being designed for interconnection during coupling of the cars with a mating probe receiving member and probe member contained on the other car, said interconnection causing said normally closed disconnect valves to open thereby providing parallel flow paths for brake pipe air between each pair of cars;
   d. sealing means associated with said members for sealing said members during interconnection of said members to prevent leakage of brake pipe air to atmosphere through said members;
   e. a normally closed, pilot operated, first valve, mounted on each end of each car and interposed between the brake pipe and said probe member to shut off the flow of brake pipe air to said probe member;
   f. a manually operated, spring biased, second valve associated with said first valve and mounted on the ends of the cars for operation from either side of the car, said manual operator serving to manually position said second valve in a venting position against the spring bias, said venting position serving to vent the pilot air from said first valve thereby causing said first valve to return to the normally closed position and allowing a disconnection of said probes from said probe receiving members while retaining the brake pipe air in the brake pipes on the respective cars;
   g. switching means associated with said manually operated second valve for switching the pilot air from said first valve to said second valve whenever said second valve is manually operated to retain said second valve in the venting position against its spring bias until the pilot air pressure from said probe member vents to atmosphere upon a disconnection of said probe receiving member and said probe member whereupon the bias of said second valve will return said valve to the nonventing position; and
   h. a manually operated, spring biased, third valve associated with said switching means for venting said switching means to allow said second valve to return to the nonventing position without requiring a disconnection of said probe and said probe receiving members.